United States Patent
Dalecki et al.

(10) Patent No.: US 7,703,724 B2
(45) Date of Patent: Apr. 27, 2010

(54) DEVICE FOR REDUCING REPETITIVE INJURY WITH IMPROVED MULTI-AXIS MOUNTING

(76) Inventors: Robert G. Dalecki, 401 Elm St., Indiana, PA (US) 15701; James F. Dalecki, 20 Ewings Rd., Penn Run, PA (US) 15765; Stephen R. Dalecki, 510 Allegheny St., Apt. 1, Holidaysburg, PA (US) 16648

( * ) Notice: Subject to any disclaimer, the term of this patent is extended or adjusted under 35 U.S.C. 154(b) by 39 days.

(21) Appl. No.: 12/231,852

(22) Filed: Sep. 5, 2008

(65) Prior Publication Data
US 2009/0008517 A1 Jan. 8, 2009

Related U.S. Application Data

(63) Continuation-in-part of application No. 11/810,809, filed on Jun. 7, 2007.
(60) Provisional application No. 60/811,532, filed on Jun. 7, 2006.

(51) Int. Cl.
*B68G 5/00* (2006.01)
(52) U.S. Cl. .................. 248/118; 248/918; 297/118.14; 297/118.18
(58) Field of Classification Search ...... 248/118–118.5, 248/918; 24/16 R, 19, 300, 301, 464, 465; 297/173, 188.14, 188.15, 188.18
See application file for complete search history.

(56) References Cited

U.S. PATENT DOCUMENTS

| | | | | |
|---|---|---|---|---|
| 2,501,580 | A * | 3/1950 | Reid | 108/157.11 |
| 2,686,701 | A * | 8/1954 | Manczur | 108/157.11 |
| 3,186,673 | A * | 6/1965 | Olson | 248/309.4 |
| 5,564,779 | A * | 10/1996 | Tolbert et al. | 297/144 |
| 6,027,165 | A * | 2/2000 | Adkins | 297/188.18 |
| 6,073,997 | A * | 6/2000 | Koh | 297/173 |
| 6,352,303 | B1 * | 3/2002 | Hope | 297/188.18 |
| 6,425,631 | B1 * | 7/2002 | Lin | 297/173 |
| 6,962,311 | B1 * | 11/2005 | Sykes | 248/118 |
| 7,131,688 | B2 * | 11/2006 | Steenson | 297/161 |
| 7,360,829 | B2 * | 4/2008 | Bufkin | 297/162 |
| 7,478,867 | B2 * | 1/2009 | Weng | 297/161 |
| 2009/0008517 | A1 * | 1/2009 | Dalecki et al. | 248/118 |

* cited by examiner

*Primary Examiner*—Korie Chan
(74) *Attorney, Agent, or Firm*—Gary P. Topolosky

(57) ABSTRACT

A device for operating a computer mouse has improved multi-axes mounting to the arm of a desk chair. The device comprises a platform with a holding area for the computer mouse. The platform should be sufficiently sized for a computer operator's forearm to rest thereon. The improved mounting for this device includes a rod from which at least two brackets are connected. One bracket rotatably connects to this rod and the other bracket slidably connects to same. Preferably, a braking mechanism prevents the platform from being rotated too far about the chair arm and dumping all holding area contents.

20 Claims, 15 Drawing Sheets

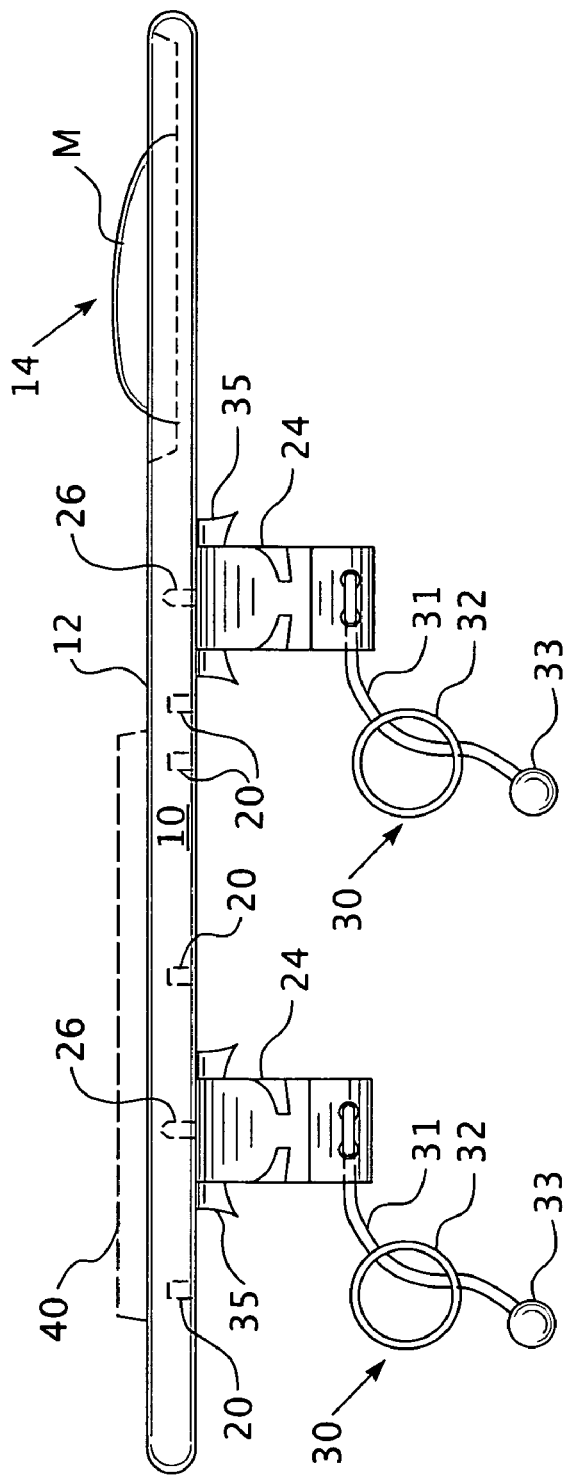
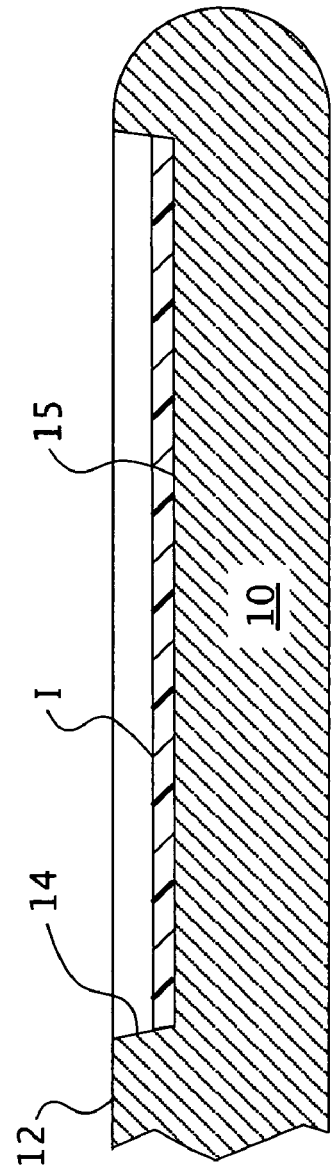
FIG. 3
FIG. 4

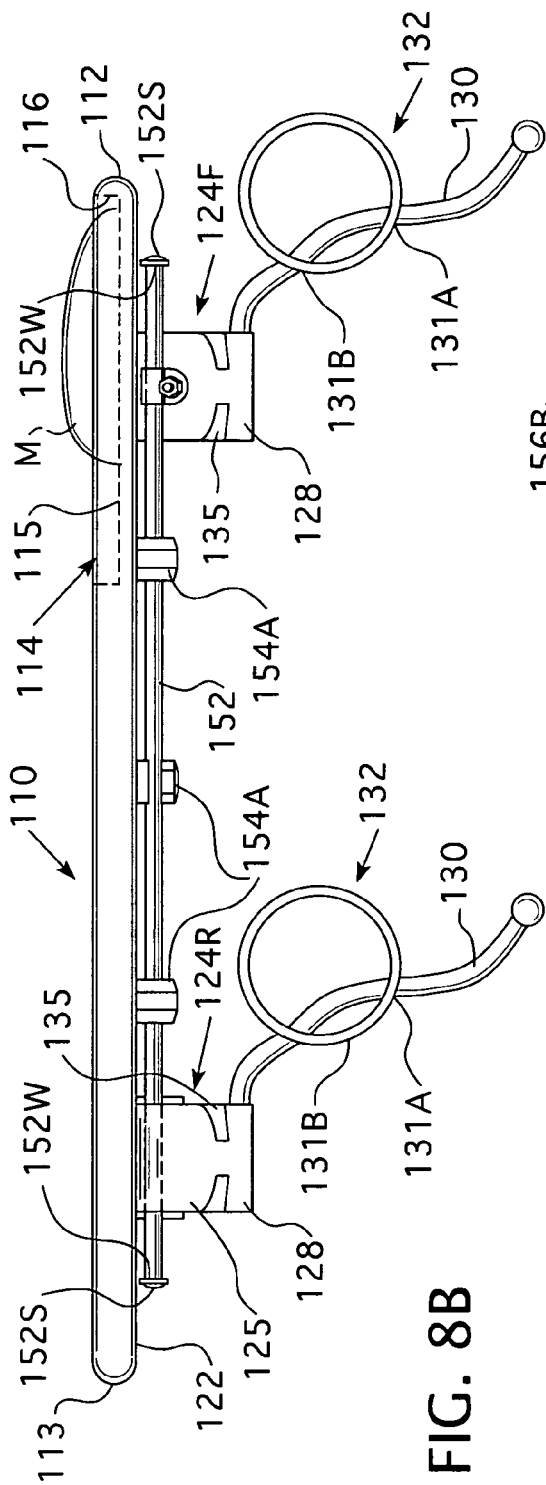
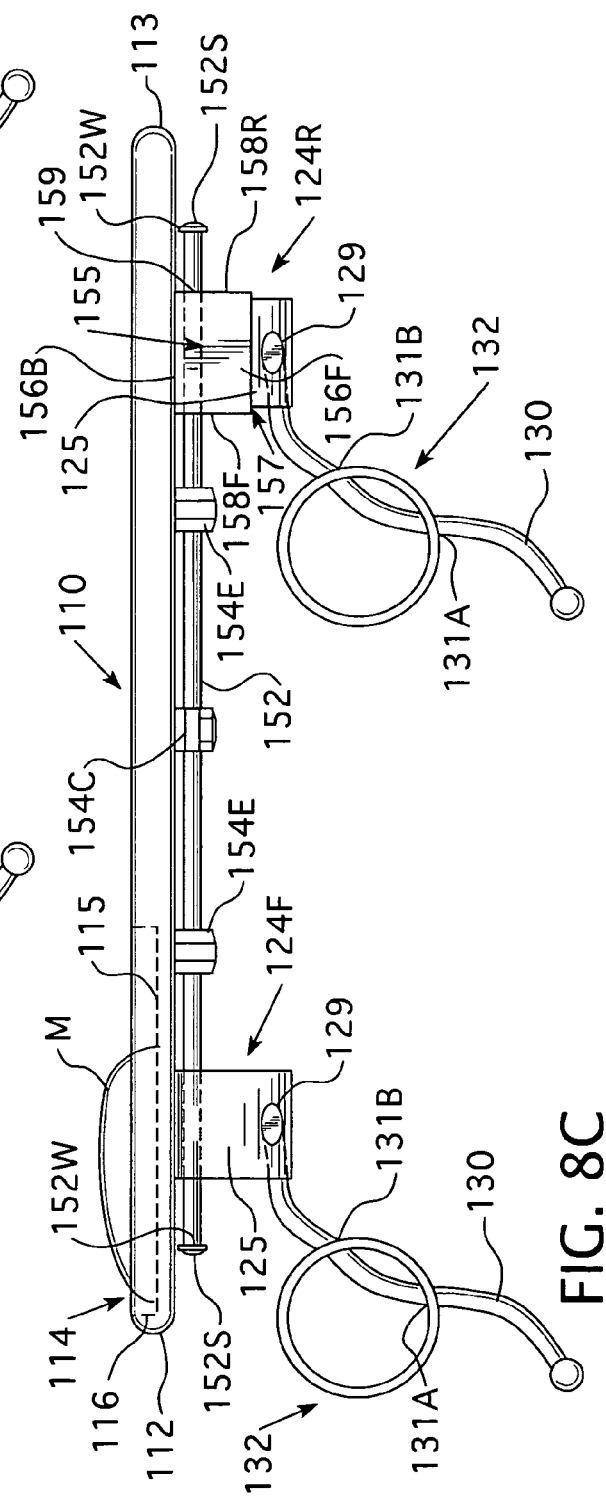
FIG. 8B
FIG. 8C

DEVICE FOR REDUCING REPETITIVE INJURY WITH IMPROVED MULTI-AXIS MOUNTING

CROSS-REFERENCE TO RELATED APPLICATIONS

This application is a continuation-in-part of application Ser. No. 11/810,809, filed on Jun. 7, 2007 and entitled "Device, System and Method for Reducing Repetitive Injury", said parent application having claimed priority to U.S. Provisional Application Ser. No. 60/811,532, filed on Jun. 7, 2006, both of which are fully incorporated by reference herein.

FIELD OF THE INVENTION

The parent invention relates to an ergonomic device and system for computer mouse usage that prevents common injuries, and to a method of preventing repetitive injuries associated with computer mouse usage.

The present invention is an improved multi-axial method for mounting such a device to the fixed arm of a typical workstation/desk chair. With these improvements, a device may be custom fit for each mouse user with adjustments: (a) extending in a line parallel to the chair arm (or in a front-to-rear sliding direction, i.e. substantially horizontal plane); (b) in a rotating, axial direction (either clockwise or counter-clockwise around or about the line parallel to the fixed chair arm); and/or (c) in a lateral direction substantially parallel to the fixed chair arm (in a left-to-right or side-to-side motion, though still in the same horizontal plane as the chair arm. Preferred embodiments include a braking mechanism for preventing the device from rotating too far around the chair arm and inadvertently dumping the mouse.

With mouse retention in a recessed well, raised border or both, this next generation of devices will allow greater adjustment for the comfort of the computer operator in more than one plane. Particular embodiments accommodate mouse manipulations in a front-to-rear slide along the chair arm; a clockwise tilt (or rotation about that arm); and/or a lateral (i.e. left-to-right) shift on the same horizontal plane as the chair arm.

BACKGROUND OF THE INVENTION

With the advent of mass personal computer usage, the incidence of repetitive injury disorders such as carpal tunnel syndrome has proliferated to the point of becoming the number one work related injury. It typically manifests itself with symptoms such as pain, numbness and/or stiffness in the hands, wrist, arm, shoulder and neck. Carpal tunnel syndrome has also been known to cause a loss of range of motion in the shoulder as well as loss of grip strength of the hand. Typically, treatments for carpal tunnel syndrome may range from non-invasive techniques such as physical therapy that includes joint manipulation, ultrasound, icing and electro-muscle stimulation, to ingestion of anti-inflammatory drugs, and to invasive procedures such as surgery for removing scar tissue within the wrist that impinges the median nerve. Therefore, a need exists to find means to permit a user to operate a computer mouse in a comfortable, ergonomic fashion that will prevent such disabling injuries.

A similar ailment, wrist tendonitis, has also been associated with computer use. The carpal tunnel is a narrow passageway in one's wrist through which the median nerve passes. This nerve carries sensations for the entire hand. It also affects the finger flexor tendons, which link one's fingers to the muscles in the person's lower arm. The tunnel is formed by walls of solid bone on three sides with the bottom enclosed by the transverse carpal ligament, a tough, inelastic cartilage. Tendonitis occurs when the tendons protect themselves from overuse. Each tendon is surrounded by a thick fluid-filled sac called a synovial sheath, which swells with extra fluid to protect the tendon. Such swelling is called tendonitis. When these sacs swell in the carpal tunnel, they can pinch the median nerve against the bone or carpal ligament. The result can be a loss of sensation in the hands and debilitating pain.

Computer use involves repetitive tasks like gripping, clicking, pushing and reaching for such items as the keyboard and mouse or other pointing device. The position of the user relative to these input devices requires extending upper extremities like the neck, shoulder, arms and hands from the desk chair to the mouse. A lack of optimum positioning, coupled with the highly repetitive nature of mouse use, may result in the aforementioned cumulative trauma injury. Efforts to decrease the stresses on a computer operator usually start only after injury symptoms first appear. The need for preventive support of an operator's upper extremities and wrist become more evident as more repetitive motion/stress related injuries are diagnosed.

Basic use of a computer mouse on a surface like a table requires positioning the user's hand in a generally horizontal plane. Such positioning may cause tendons in the hand to lie strained resulting in user discomfort. Further use in that position exacerbates the discomfort and may result in irritations of the carpal tunnel in some users. An invention is needed that allows a user to grasp the mouse with the wrist in a more natural upright position. Such an invention should reduce the stress on and swelling of the synovial sheath, thereby reducing the chance of sustaining a repetitive stress injury.

Tables exist that mount to the arm of a desk chair. But such tables do not typically tilt to the right or left about the X-axis, or in the same plane as the Z-axis. The parent invention creates a more neutral, upright position for the computer user's hand, wrist and forearm when using a mouse to alleviate tensions on the carpal tunnel. With the further adjustments of the present invention, it is possible to situate the user's elbow below their shoulder reducing at least some of the pressures exerted on a user's neck muscles.

Other devices involve more complex systems and may require specialized chairs. For example, U.S. Pat. No. 5,884,974 (Bergstem et al) describes a chair having supporting armrests that are adjustable in height, pivotable and longitudinally slidable. Unlike the parent invention, this device neither rotates the wrist into a natural position. Nor does that chair position a computer user's elbow below the shoulder.

U.S. Pat. No. 6,648,282 (Sykes) also fails to rotate a computer user's hand, wrist and forearm to a more natural upright position.

U.S. Pat. No. 5,730,408 (McAllister, et al) describes a workstation support for a keyboard and mouse. That device does not position the user's wrist in a preferred natural position. Instead, it forces the user to lean forward in the chair placing greater stress on his/her upper back and neck.

SUMMARY OF THE INVENTION

The parent invention relates to a device that affords an adjustable armrest for a personal computer user. More particularly, the parent invention device should relieve some symptoms associated with repetitive motion syndrome (RMS) while using a mouse or other computer pointer.

Computer users suffer many maladies from extensive use of a mouse. Users often find themselves bracing their arm against the sharp edge of a desktop while manipulating a mouse. This results in uncomfortable pressures on the wrist and lower forearm.

Numerous wrist pads, wrist supports, arm supports, and ergonomic methods known in the art have addressed the problem of providing comfortable use of a computer mouse, but none have proven fully effective. Thus, there exists a need for a device that will allow the computer user to comfortably use the mouse while preventing pain to the wrist, forearm and neck.

The parent invention is a device, system and method designed to relieve symptoms associated to repetitive strain injury of the hand, wrist, forearm and neck while using a computer mouse. It comprises a platform having a holding area, either a recess or raised lip region, and a mounting mechanism. The platform preferably is made of wood, metal or plastic and has a mounting means for attaching the platform to the arm of a seating venue like a desk chair. The device is mounted using brackets designed to allow the platform to tilt to the right (or left if the operator is left-handed) about the X-axis. This tilting motion permits a user's hand, wrist and arm to rest in a more neutral position while holding a computer mouse, thus greatly reducing the stresses within the wrist. These stresses are a leading cause for the incidence of repetitive strain injury.

The platform preferably contains a recess at one end proximally located closest to the computer. A computer pointing device like a mouse substantially resides in that recess when in use. The recess should be of a sufficient depth for reducing the proclivity of the mouse falling out and off the platform even when not in use. In one preferred system, the computer mouse is a cordless model.

The parent invention is an ergonomic device, system and method for relieving stress to the upper back and neck. While using a computer mouse, the conventional position of a user's arm extends in front of the body thus placing elevated stress on the user's upper back and neck area. The invention relieves such stresses by allowing the user's arms to reside closer to their side and allowing the user's elbow to remain below the shoulder. To allow a more perfect fit for a user's arms, the platform can be adjusted longitudinally, i.e. along the X-axis (as indicated in accompanying FIG. 1A), to be either more proximal or distal to the chair arm on which this mouse platform is mounted.

With computer use becoming more common, the workspace of an existing office is increasingly more crowded with added computer equipment. It is often necessary to purchase additional furniture to provide work surfaces on which to deploy such equipment. This is particularly true where the data input device uses a mouse, a track ball or digitizer tablet in addition to the keyboard for a personal computer or computer workstation. The foregoing device alleviates such problems.

The present invention represents an improvement by making armchair mounting of the parent device even more flexible, adaptable and customizable. Now, such devices may be custom "fitted" with extension adjustments (i.e. front-to-rear), rotational adjustments (around the axis of a fixed chair arm), diagonal adjustments (left-to-right or side-to-side) and combinations of same. Multiple axis mounting will accommodate platform device adjustments in several planes to better accommodate preferred user comfort levels.

BRIEF DESCRIPTION OF THE DRAWINGS

Still other objectives and advantages of the parent and present inventions will become apparent to those skilled in the art after reviewing the detailed description that follows made with reference to accompanying drawings in which:

FIG. 3 is a right side schematic view of the FIG. 1A device, the left side view being a mirror image thereof;

FIG. 4 is an exploded partial side view taken along lines IV-IV of FIG. 2A;

FIG. 8B is a right side schematic of the device from FIG. 8A with a computer mouse resting thereon;

FIG. 8C is a left side schematic of the FIG. 8A device and mouse;

DETAILED DESCRIPTION OF PREFERRED EMBODIMENTS

Figure 1A:
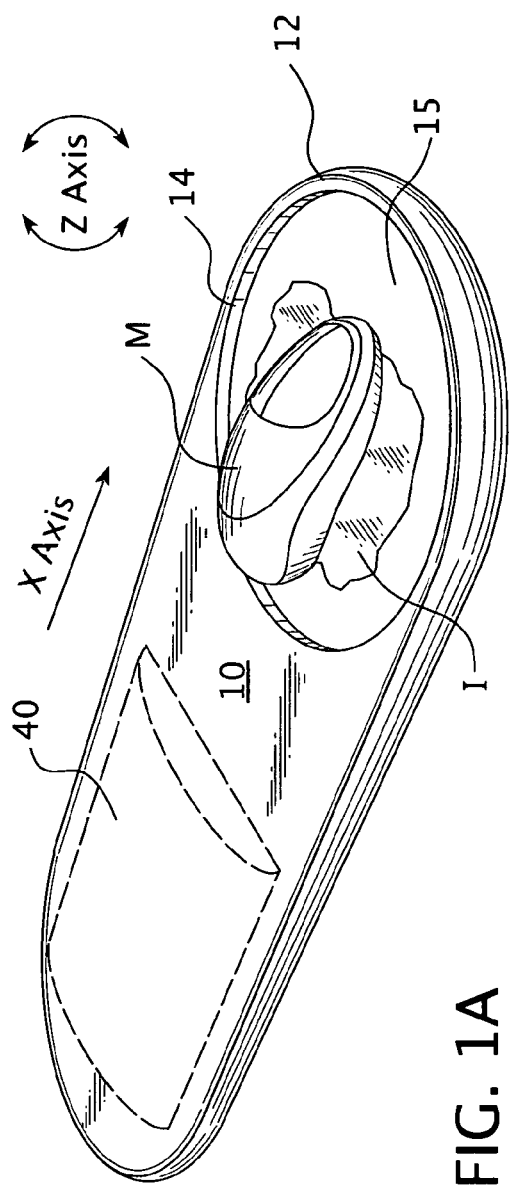
FIG. 1A is a perspective view showing one preferred embodiment of the parent device.
Figure 1B:
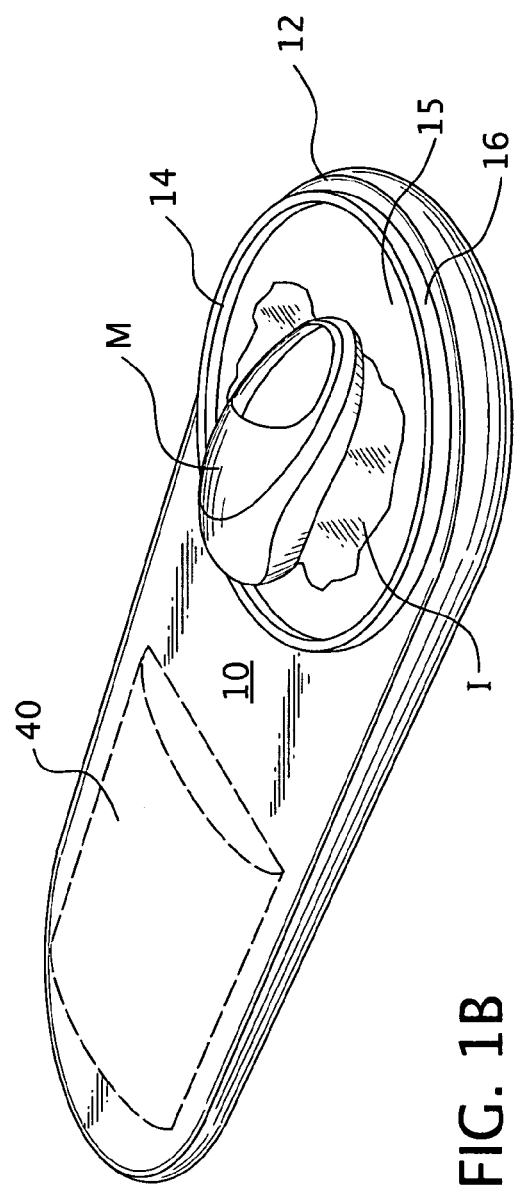
FIG. 1B is a perspective view showing an alternate embodiment of the parent device with a raised lip region instead of a platform recess.

Referring to the accompanying FIGURES, the device of the parent invention comprises a substantially planar surface, or platform 10 having at its forward end 12 a mouse holding area 14. That area should include a substantially planar region 15 about which a computer optical mouse, preferably a cordless mouse M, may be manipulated or allowed to rest when not in use. In one preferred embodiment, mouse holding area 14 is a slight recess or detent into platform as per FIG. 1A. Alternately, mouse holding area 14 may exist in substantially the same plane as platform 10 but separated by a raised lip region 16 as better seen in FIG. 1B. Preferred embodiments allow for a coating surface on the mouse holding area 14 for easier mouse movement, operation and/or maintenance. In more preferred embodiments, holding area 14 may be fitted with a changeable insert I in which a photograph or promotional logo may be inserted and over which the mouse may still be operated. Whether recessed into the platform, or separated from platform 10 by a raised lip 16, mouse holding area 14 is intended to reduce the proclivity of the computer mouse M from falling out of that area and off platform 10 when the mouse is not being used.

The parent device further includes means for mounting platform 10 to a computer operator/user seating venue such as an armchair (not shown). Preferably, platform 10 is made of wood, metal, plastic or combinations of same. Most preferably, for aesthetics and feel, platform 10 is made from a well varnished, stained wood. That planar surface is mounted to the arm of the seating venue, most preferably a computer desk chair. The planar surface is attached to the seating venue in a manner that allows tilting or rotation about the same X-axis, and in the same plane as the Z-axis (per FIG. 1A), when affixed to the right or left arm of a computer desk chair depending on whether the computer mouse operator is predominantly right- or left-handed.

Figure 2A:
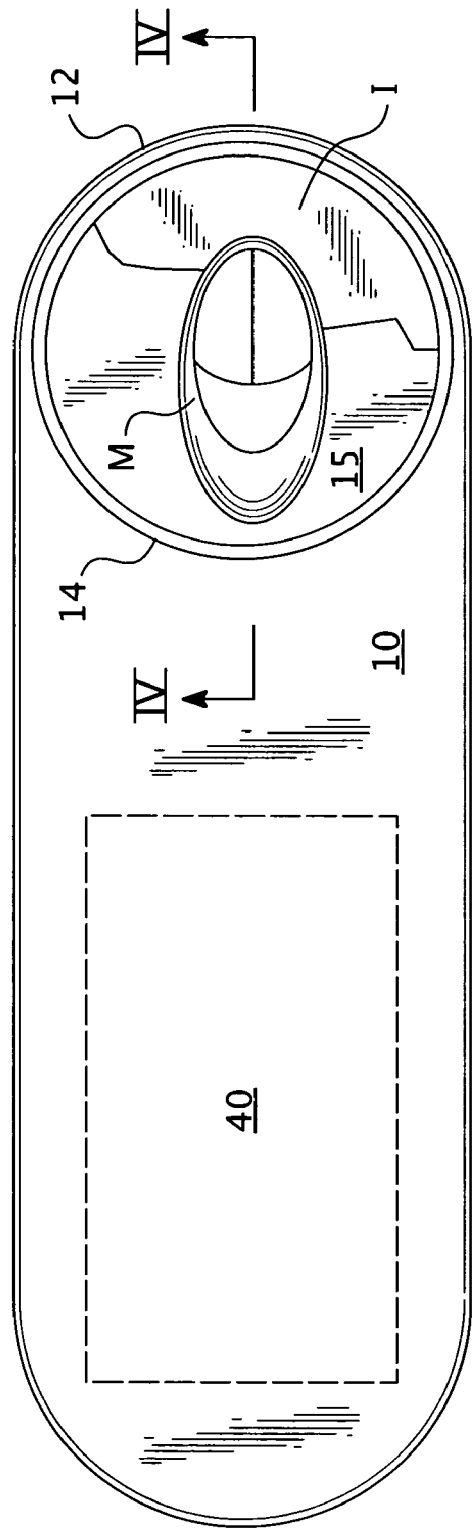
FIG. 2A is a top schematic view showing the parent device from FIG. 1A.
Figure 2B:
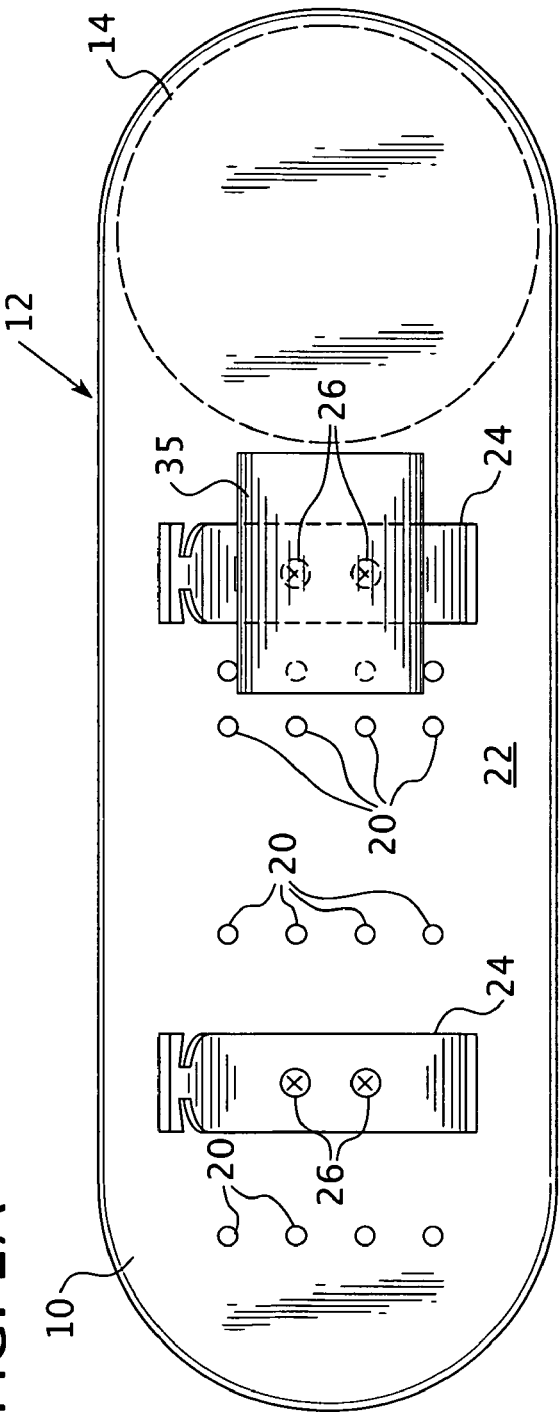
FIG. 2B is a bottom schematic view of the FIG. 1A device with the mounting means removed.

One preferred mechanism for accomplishing such mounting includes a plurality of spaced apertures 20 into the underside 22 of platform 10 as better seen in accompanying FIG. 2B. Such apertures serve as pre-configured receptacles for receiving a plurality of preferred bracketing attachments 24 described in greater detail hereinafter. Each bracketing attachment 24 is shown with two sets of screw holes 26 for accommodating use by an operator who is either right or left-handed. Each set of screw holes includes a plurality of positions for accommodating an armrest on the variety of chairs/seating venues currently being commercially offered.

It is preferred that the parent platform be secured to the left or right arm of the computer operator's armchair in a tension-promoting arrangement. One means for accomplishing supplemental securing is to position a twistable shock cord clip 30 for stretching under the arm of the armchair and securing at either end to preferred platform mounting means, or bracket 24. In this embodiment, each bracket 24 is made from a half section 25 of roughly four inch diameter ABS plastic for creating an arch arrangement. The inside of the half section 25 rides on the arm of the seating venue/armchair. More preferably, a piece of thick protective fabric or textile 35 can be fixedly attached to, or subsequently inserted on the inside arch of each bracket before or after mounting to protect the seating venue material from possible disfigurement by the invention. See, the right bracket in FIG. 2B and the inserted fabric 35 in both brackets of FIG. 3.

As best seen in FIG. 3, each shock cord clip 30 include an elastic cord 31, that is threaded through a section of three inch diameter ABS tubing 32 before ending in a knot or knotted ball 33. Such a clip configuration quickly connects to an end of bracket 24. For increasing the amount of pressure applied against bracket 24, the tubing component 32 of clip 30 can be twisted from beneath the fixed chair arm to which platform 10 will be fastened.

One preferred embodiment of the system of the parent invention also includes a cushion 40 (shown in silhouette in FIGS. 1A through 4). Cushion 40 would be appended to platform 10 for protecting the mouse user/operator from abrasion. It can be made of any soft and durable material. In one embodiment, cushion 40 includes a one half-inch section of foam beneath a washable outer covering. As such, cushion 40 should removably attach to platform 10. One such method of cushion attachment employs hook-and-eye tape, also more commonly known as Velcro® tape (not shown). In that embodiment, a first strip of Velcro® tape is attached to the underside of the cushion and the corresponding, complementary strip of Velcro® tape (either the hook or eye portion) is attached to the uppermost platform surface.

Figure 5A:
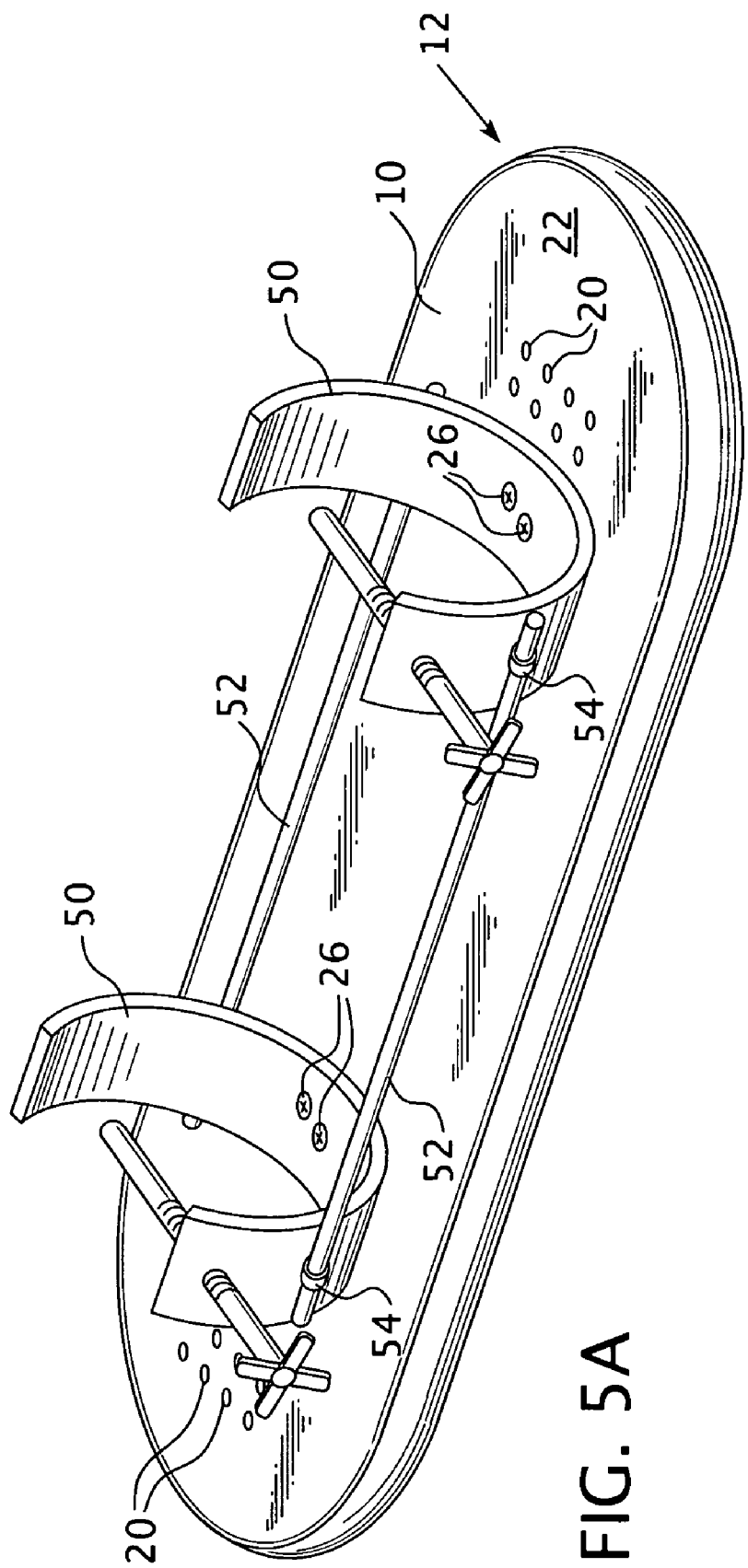
FIG. 5A is a perspective view of a first alternative mounting bracket means for use with the parent device.

Alternately, parent platform 10 may mount to the arm of a desk chair with a plurality of (preferably two) screw clamp brackets, item 50 in FIG. 5A. Should some longitudinal adjustment be desired, the mounting means may include a plurality of longitudinally extending rods 52 for fitting into and between rod mounting clamps 54 on the brackets proper. This mounting means is a viable option when less axial rotation about the X-axis is critical.

Figure 5B:
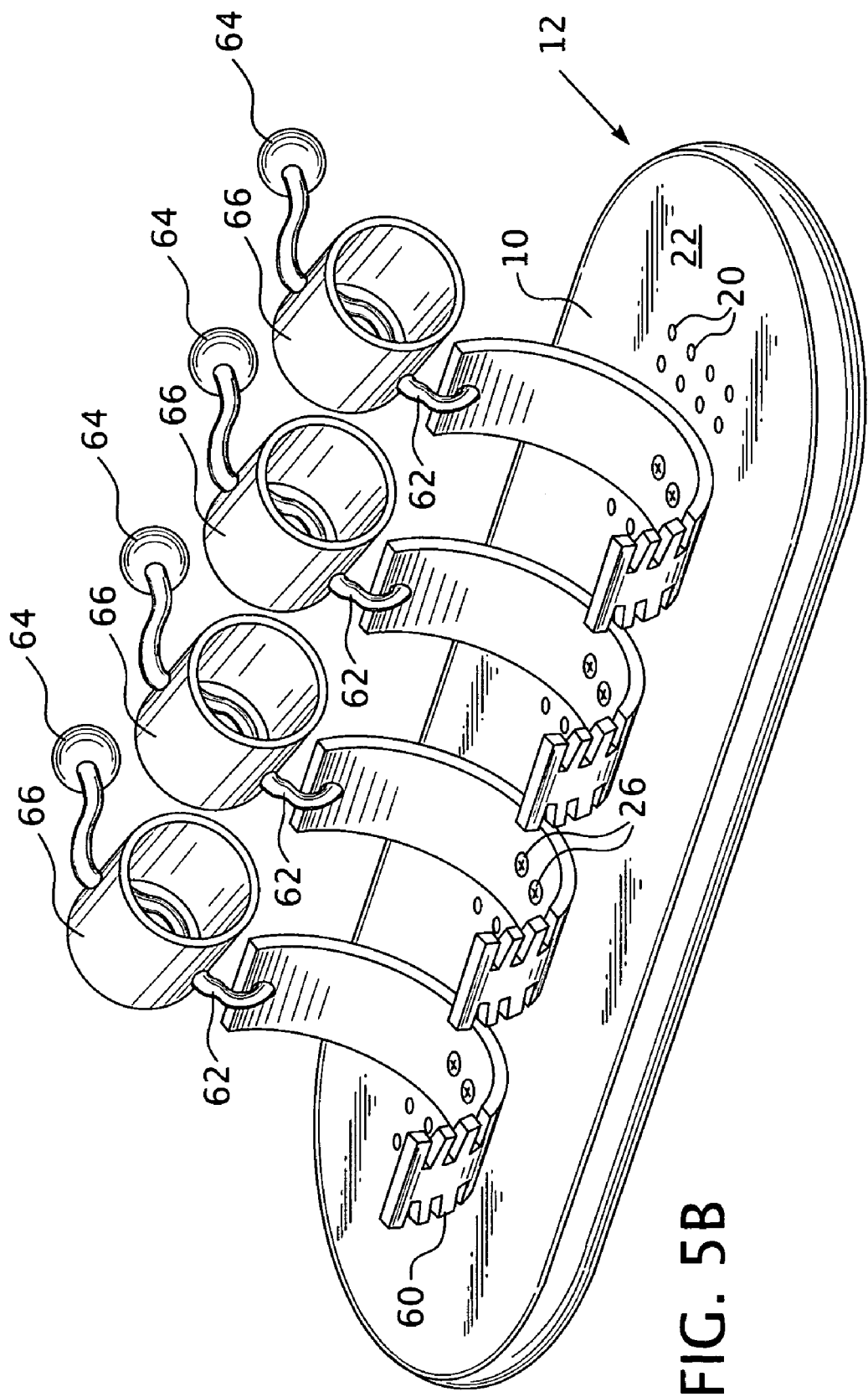
FIG. 5B is a perspective view of a second alternative mounting bracket means for same.

Referring now to FIG. 5B, still other mounting means may include a plurality of multi-tined brackets 60, about which a plurality of shock cord-like devices 62 may wind about after proper positioning on the left or right arm of a computer desk chair. To better tension these mounting means about the armchair, each shock cord knot 64 may be loosened and its corresponding shock cord tubing 66 twisted.

Latest Improvements

In FIGS. 6 through 12, there is shown a further improved device for reducing repetitive workplace injuries. This latest device may be first mounted or situated on the arm A of a typical desk chair such as the one with a chair back B and seat section C partially shown in FIG. 6. In that same view, several arrows are included for showing how this improved device may be adjusted in multiple directions, i.e. the x and y axes, and the relative planes associated with same, to better suit the mouse user/operator.

For this latest device, elements with comparable equivalents in the parent invention are commonly numbered though in the next hundred series. Accordingly, the new device of FIGS. 6 through 12 includes a platform 110 with forward end 112, rearward end 113 and mouse holding area 114. Preferably, that holding area includes a substantially planar region 115 that terminates in a raised lip region 116 in which computer mouse M may rest. Like its predecessor, platform 110 may be made from wood, metal, plastic or combinations of materials.

The underside 122 to platform 110 has several (at least two) mounting attachments or brackets 124. Preferably, there is a forward bracket 124F and rear bracket 124R, each bracket differing by how they join or otherwise attach to the rod 152 that either extends along the left or right of underside 122.

Figure 7:
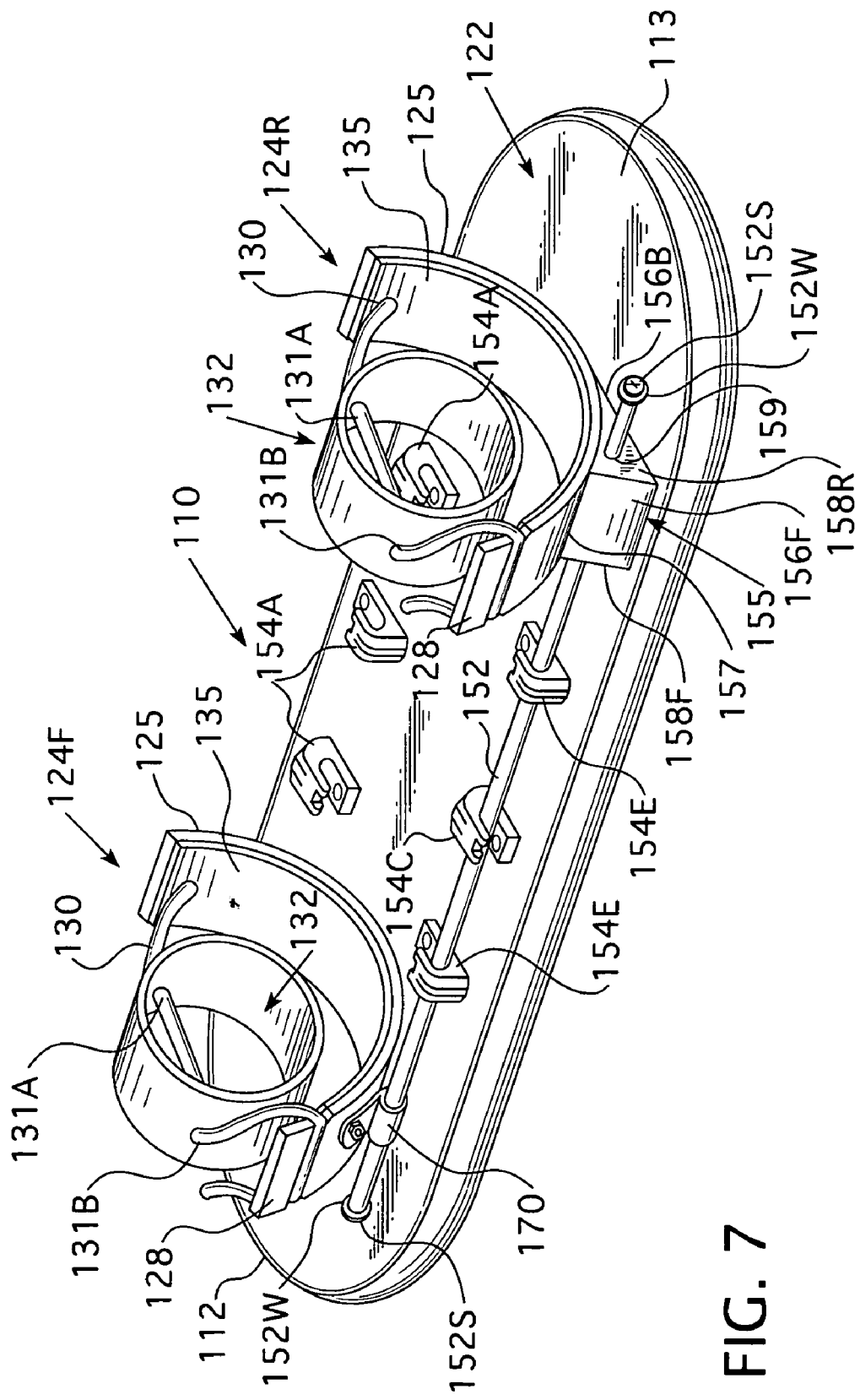
FIG. 7 is a perspective view of the underside to one improved device according showing a preferred mounting means for that device.
Figure 8A:
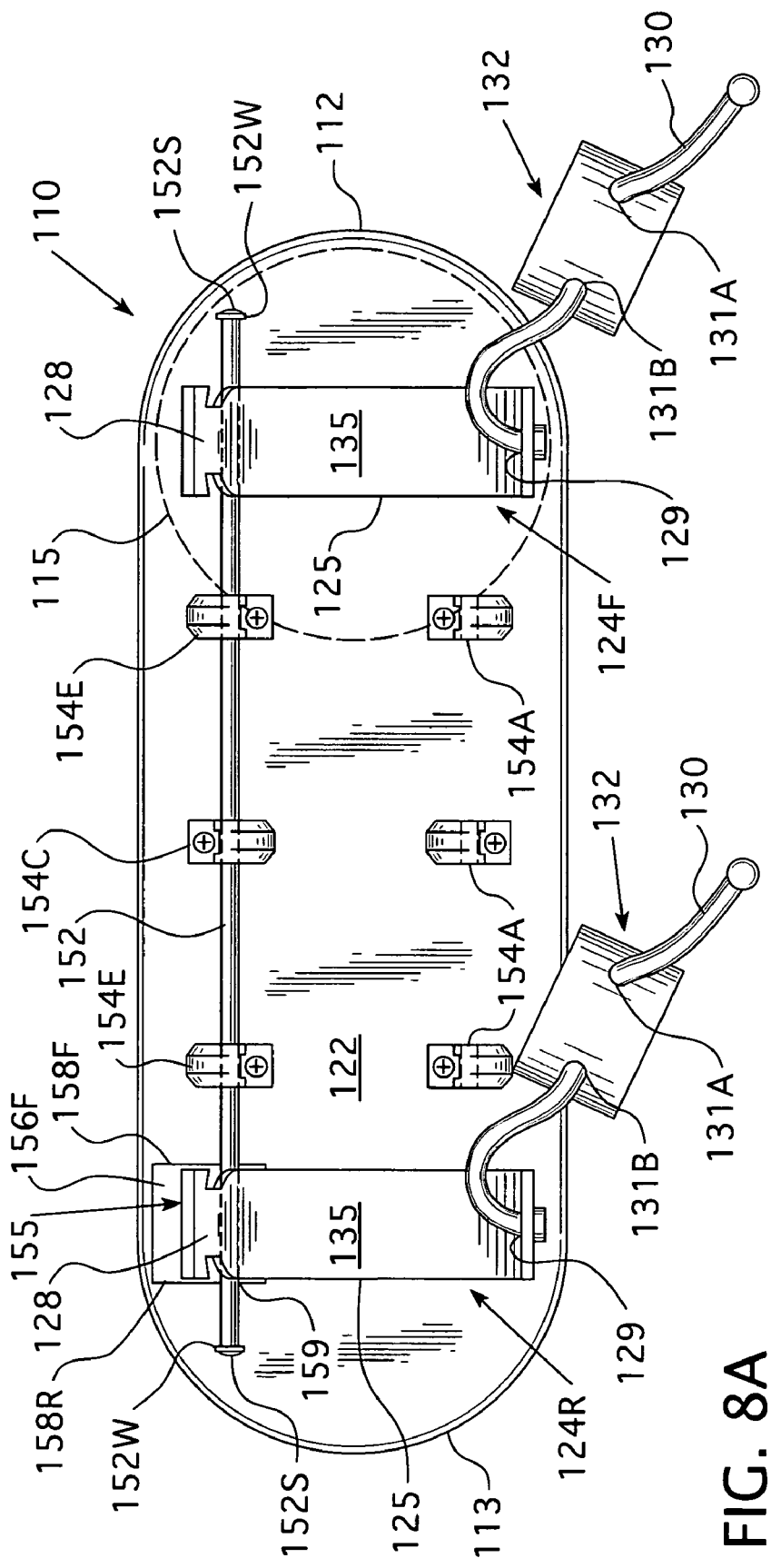
FIG. 8A is a bottom schematic view of the device from FIG. 7 with the bracket cords not fully attached.

Rod 152 preferably connects to the platform underside 122 by extending through a plurality of rod mounting clips 154. As best seen in FIGS. 7 through 8C, one preferred embodiment extends rod 152 through at least three clips 154, one of which (center clip 154C) is hooked in a direction opposite the others (end clips 154E) for minimizing lateral sliding of the rod 152 along underside 122.

At each end of rod 152, there is an end cap made up of a rod washer 152W and screw 152S. Together, these rod end caps retain the rod assembly after it has been slid through the mounting clips 154 and respective brackets 124F and 124R. Such rod end caps also accommodate full "flipping" of the device should a left chair arm mount be preferred over a right arm attachment. For accomplishing that switch, one end of rod washer 152W and screw 152S are separated from the assembly. Rod 152 is then slid out of the first combination of clips 154 E and C. Both front and rear brackets 124F and R are rotated 180 degrees to face the other side edge of device 110. The rod is then threaded back through a first rotated bracket, the alternate set of clips 154A and the second bracket (124F or R, as appropriate) before the washer 152W and screw 152S are reinstalled.

There are several commonalities between front bracket 124F and rear bracket 124R. Each is made from a half section 125 of roughly four inch diameter ABS plastic. As better seen in FIGS. 7 through 8C, one end of both front bracket 124F and rear bracket 124R includes a T-shaped, cord holder 128. In alternative embodiments (not shown), cord holding may be accomplished with a recessed V-shape or other indentation. Through an aperture 129 in the opposite end of half section 125, there is threaded a twistable, shock cord 130. In this embodiment, said cord is made from ¼ inch diameter elastic though numerous other materials may be substituted for same. Cord 130 is passed through holes 131A & B in a thick section of ABS tubing that serves as a supplemental tensioner 132. Though not shown, the loose end of cord 130 extending beyond tensioner 132 may be knotted or balled to prevent fraying.

The presently depicted embodiment has a T-shaped holder 128 and cord 130 combination for quickly, yet firmly securing platform 110 about a fixed desk chair arm A. See especially, FIGS. 9A and B. It should be understood, however, that other mounting means may be fully or partially substituted for these main bracket components. For instance, one may alternatively use varying combinations of belts and buckles, straps with spaced rivets and corresponding snaps, or several hook and eye tape (or Velcro) segments.

Figure 9A:
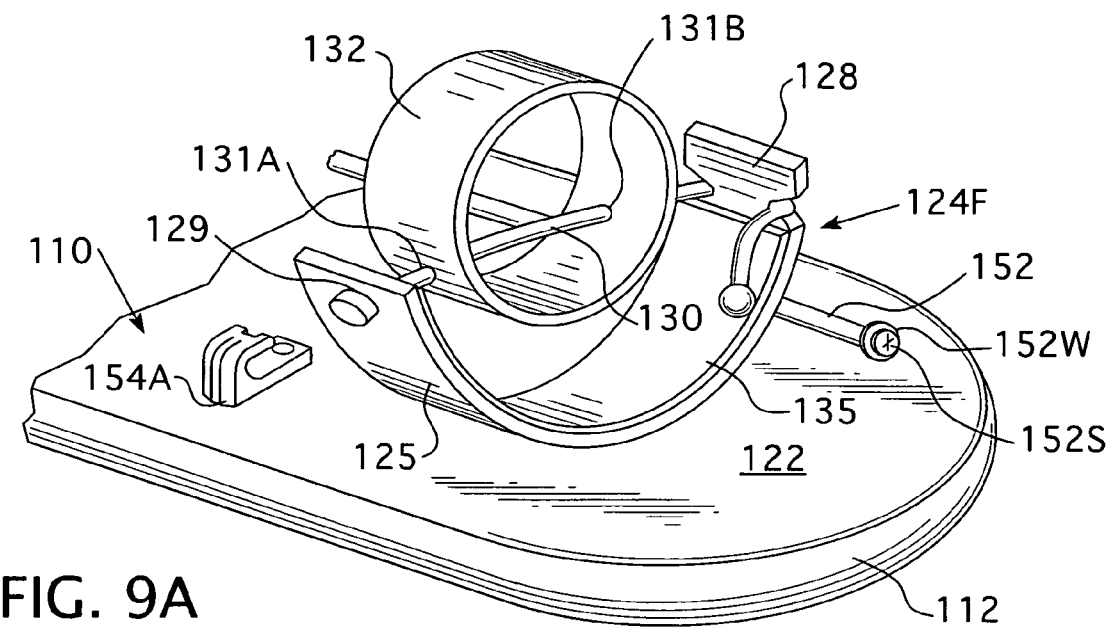
FIG. 9A is an upper left, partial perspective view focusing on a front flexible bracket pivotally affixed to a right side mounted rod with the cord for said bracket attached to both indents of the T-shaped end and the tube-shaped tensioner raised.
Figure 9B:
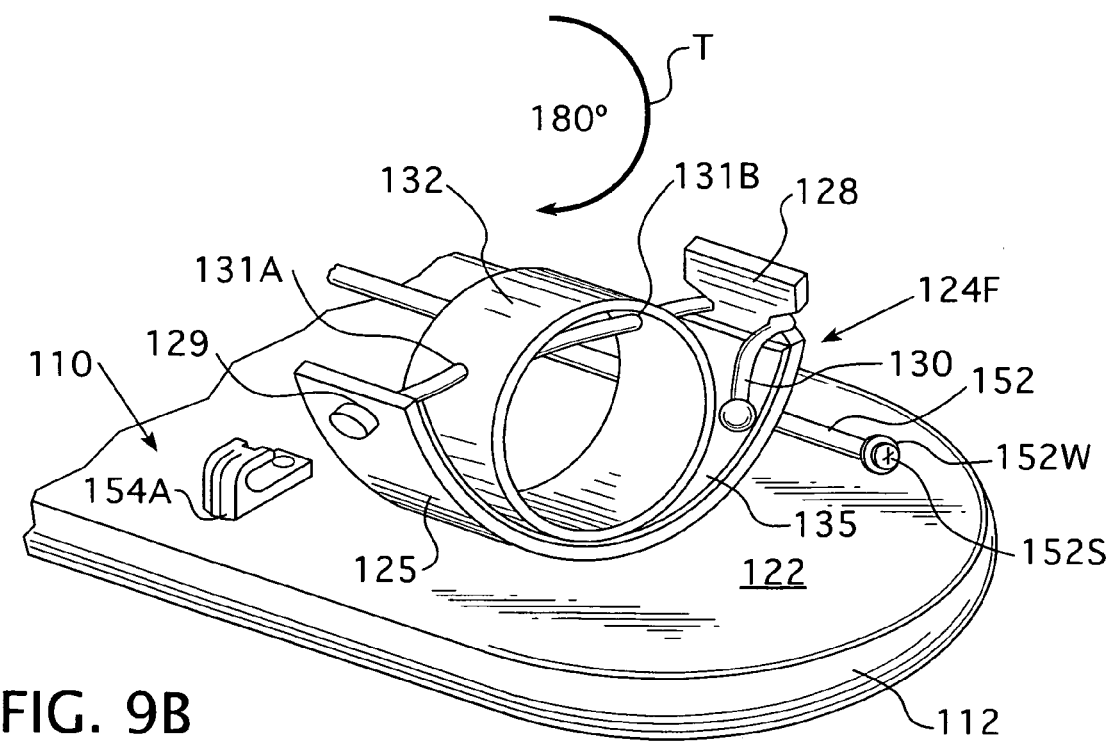
FIG. 9B is an upper left, partial perspective view of the FIG. 9A bracket with the tensioner rotated about its cord 180 degrees.
Figure 10A:
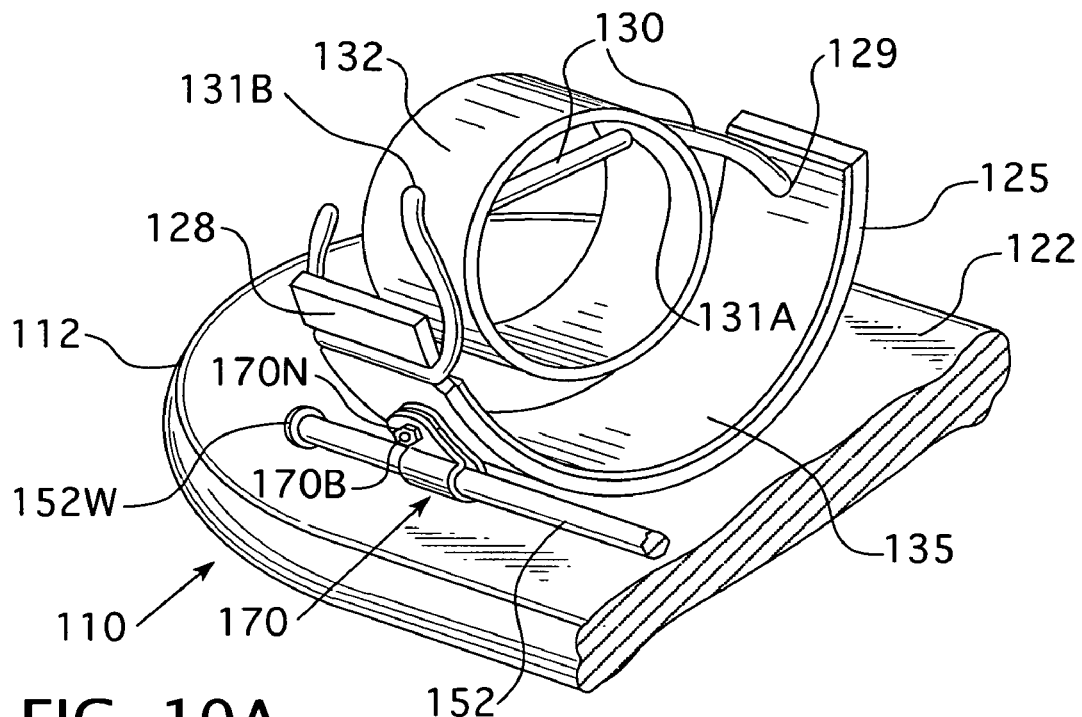
FIG. 10A is an upper right, partial perspective view focusing on the rotatable mount for the front flexible bracket.
Figure 10B:
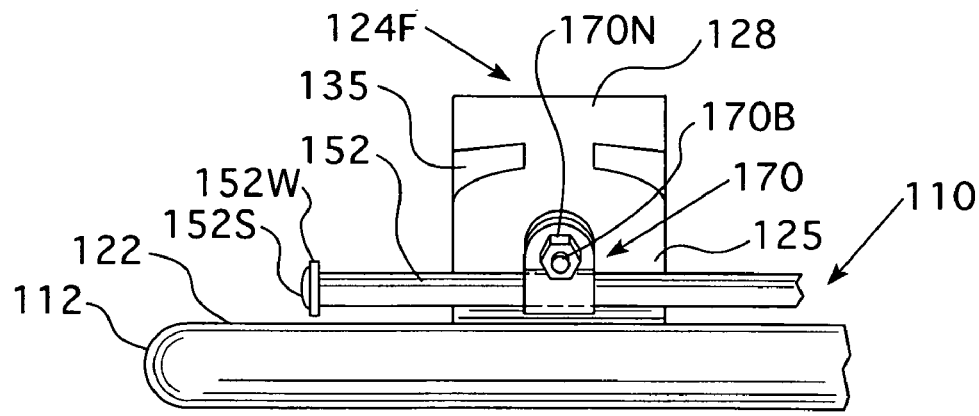
FIG. 10B is an exploded partial side view of the FIG. 10A rotatable mount, bracket and rod.
Figure 10C:
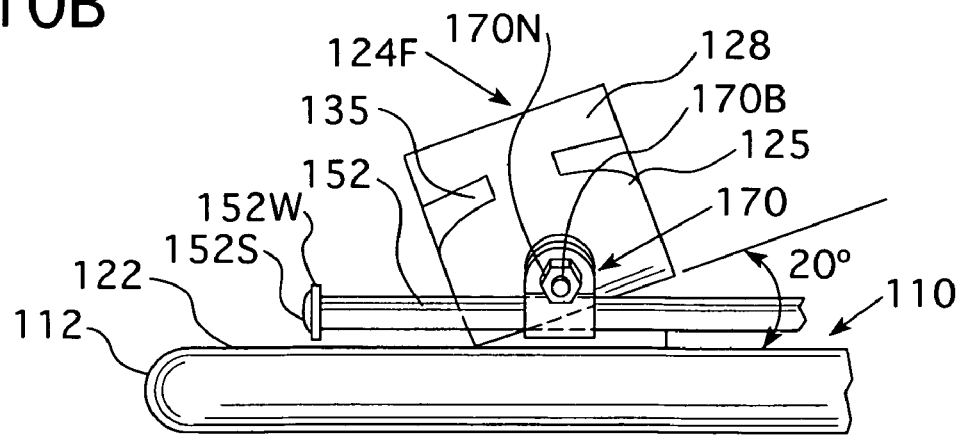
FIG. 10C is an exploded partial side view showing the FIG. 10B bracket twistably rotated 20 degrees on its bolt mount.
Figure 10D:
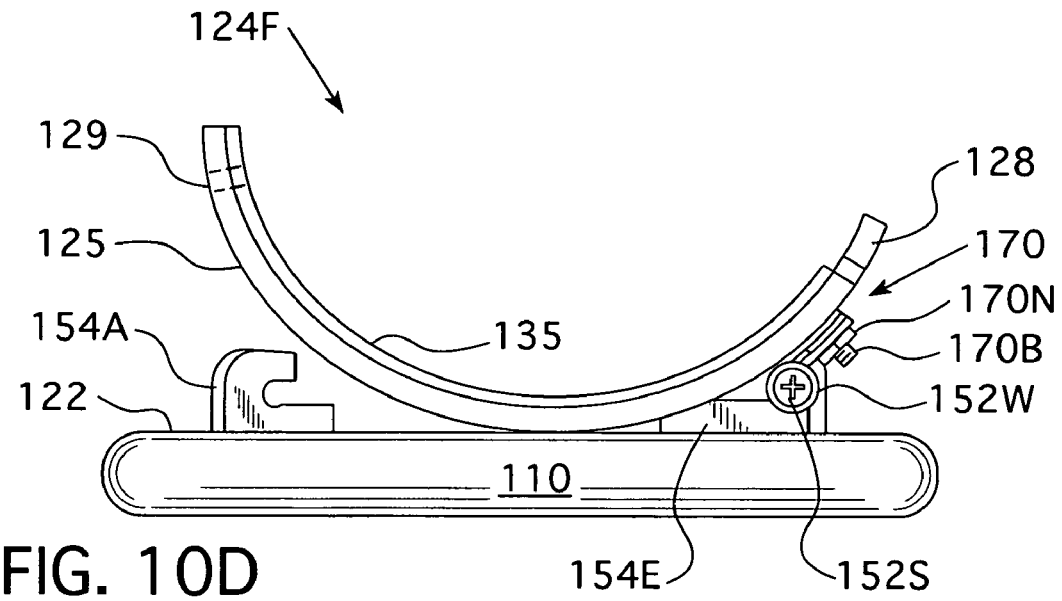
FIG. 10D is an exploded front view of the FIG. 10A mount, bracket and rod with the tensioner removed for greater visibility.
Figure 10E:
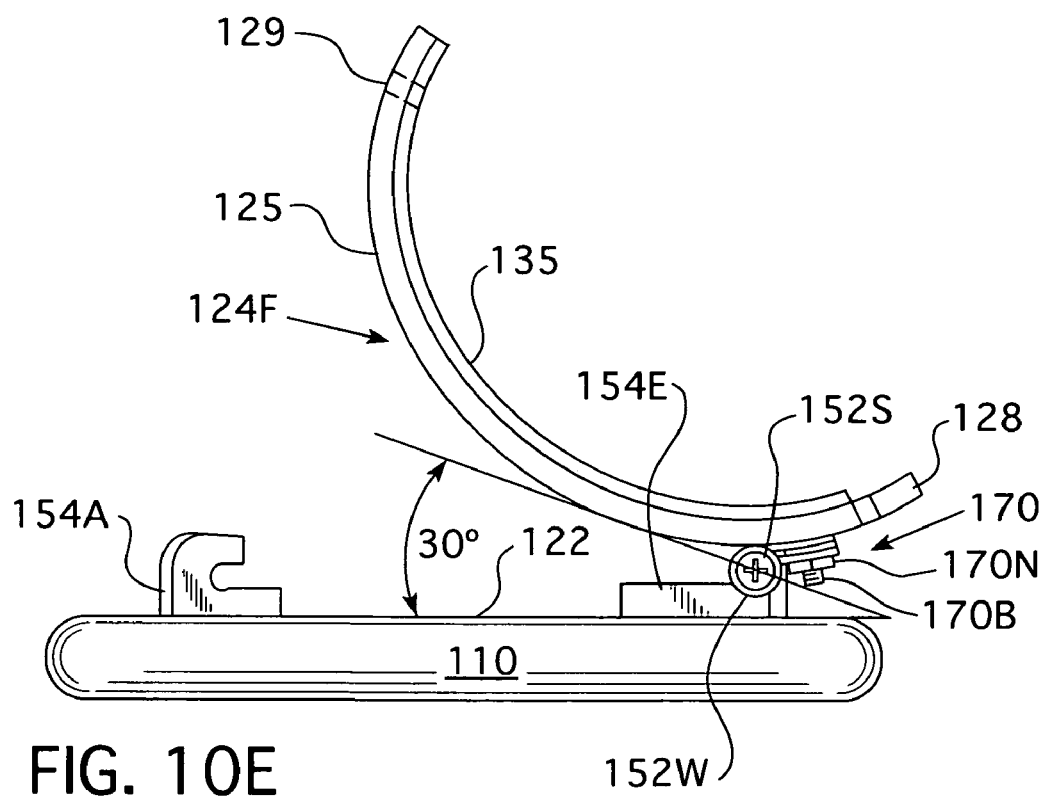
FIG. 10E is an exploded front view of the FIG. 10D bracket rotated 30 degrees on its rod connector.
Figure 11A:
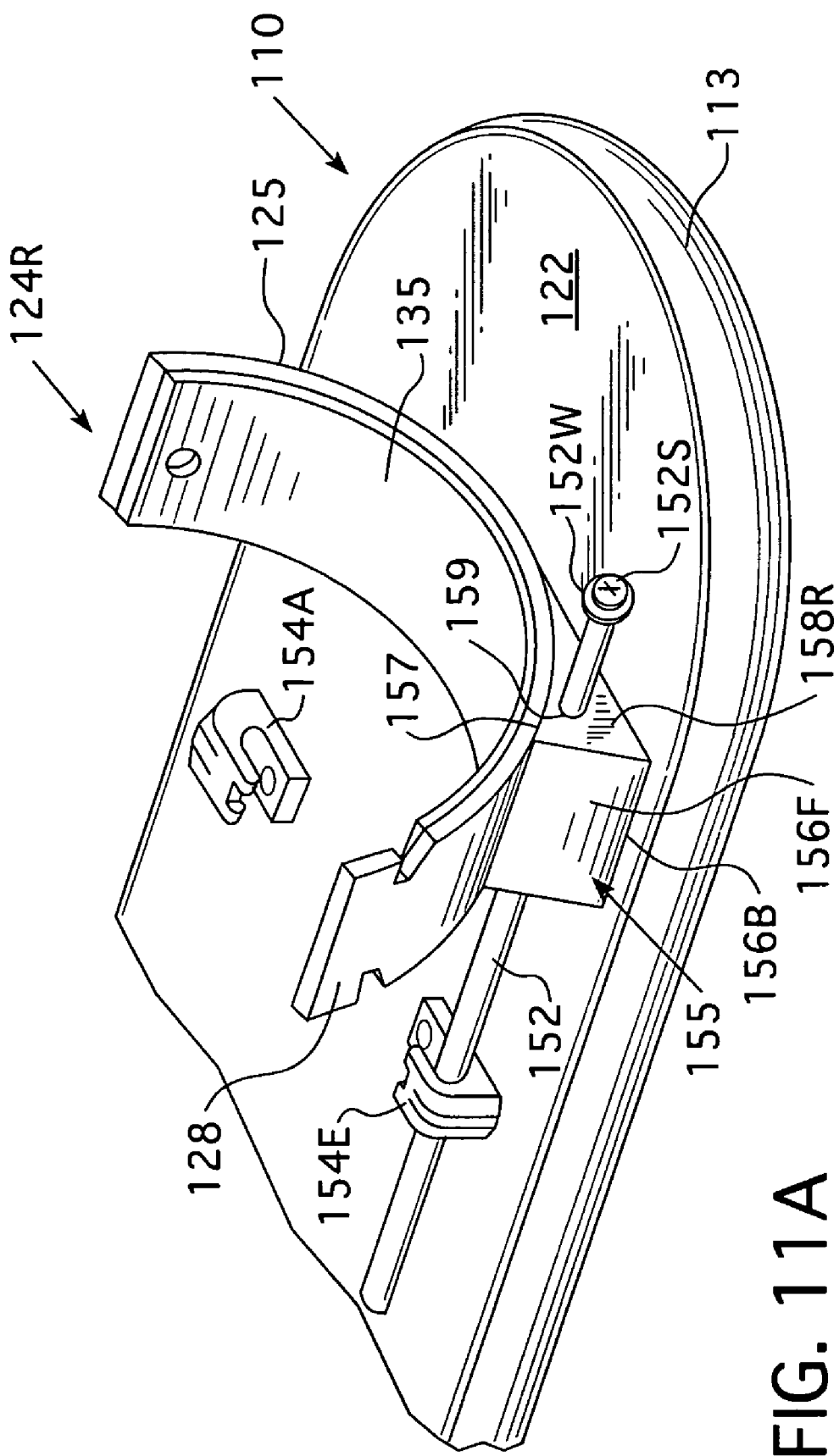
FIG. 11A is an upper left, partial perspective view of a rear bracket focusing on its braking mechanism and rod with the tensioner removed for greater visibility.
Figure 11B:
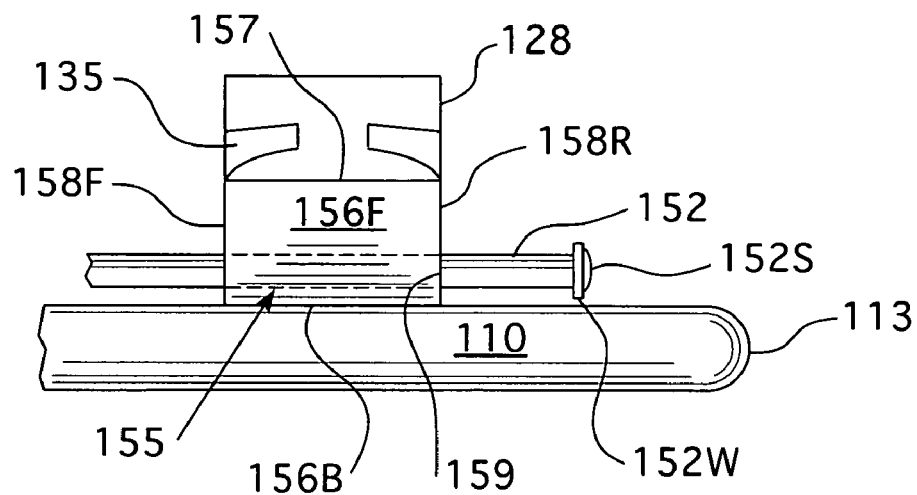
FIG. 11B is an exploded, partial side view focusing on the braking mechanism from FIG. 11A.
Figure 11C:
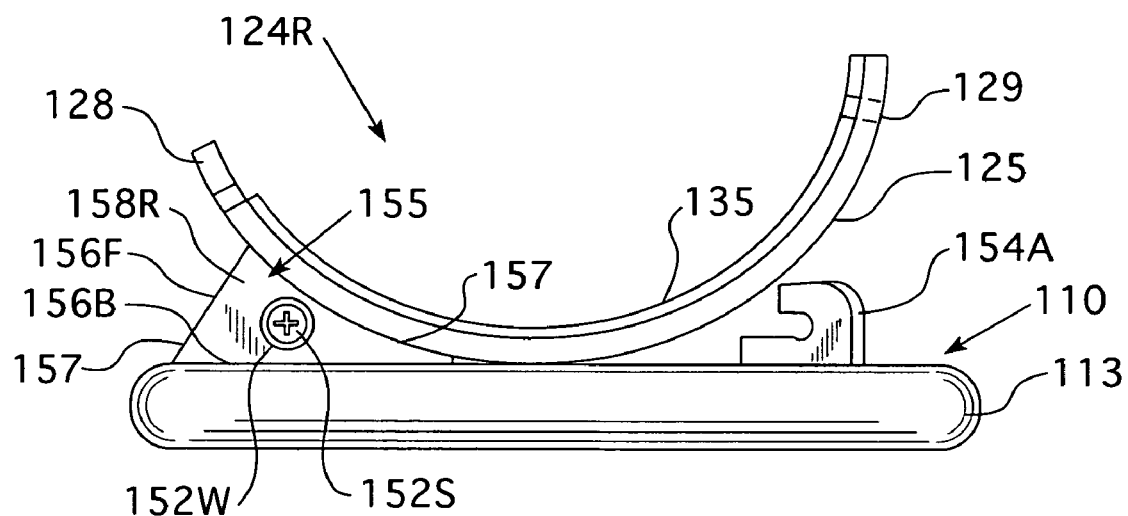
FIG. 11C is an exploded rear view focusing on the FIG. 11A braking mechanism with the tensioner removed for greater visibility.
Figure 12:
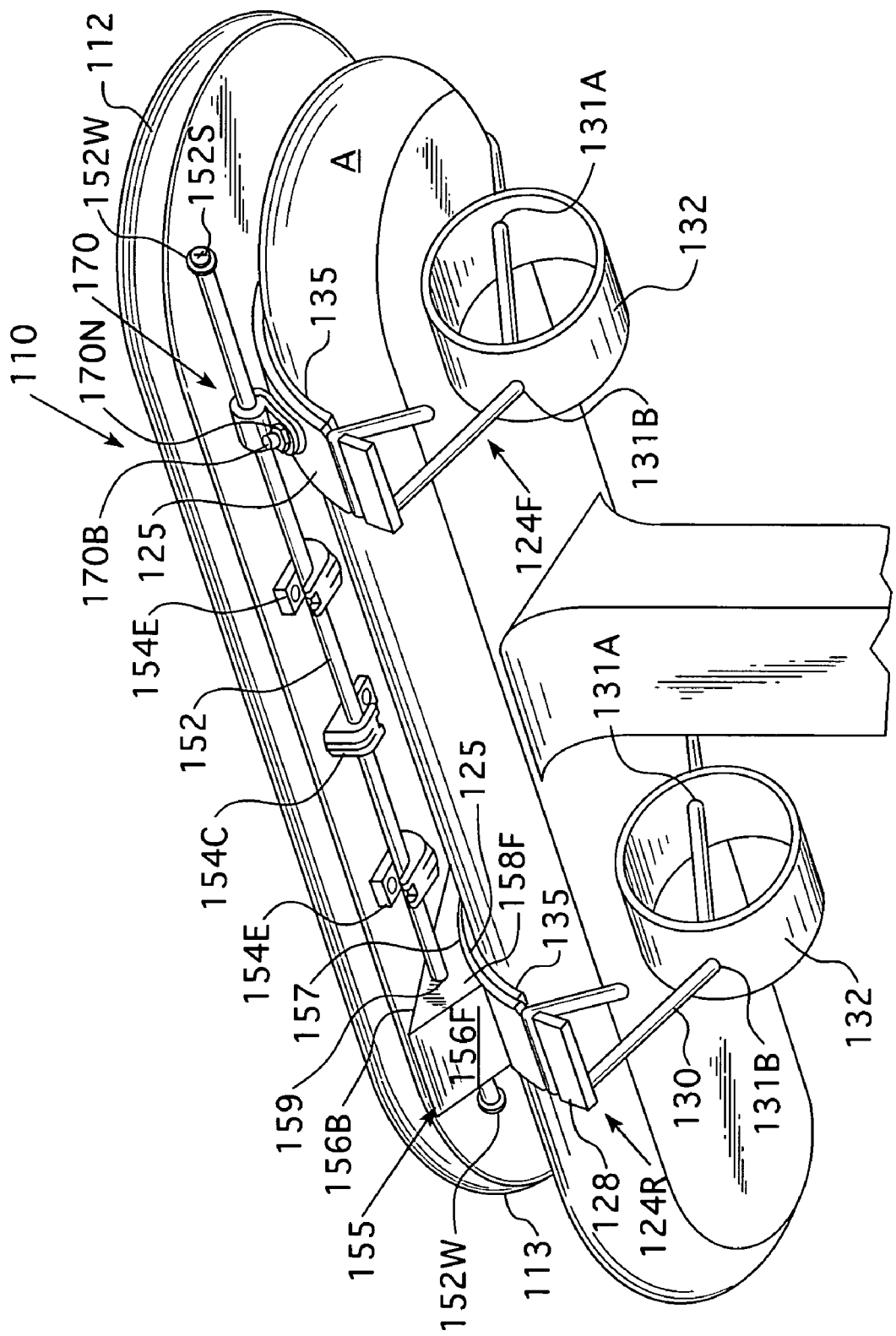
FIG. 12 is a lower left perspective of one device installed on a desk chair arm A.

During installation of the present device, cord 130 from each bracket 124F and R is fed beneath a desk chair arm A and reattached to one or both sides of its particular cord holder 128. If not needed, the tensioner 132 may be allowed to rest outside the cord 130 during device usage. But, should either bracket need to be further tightened against the chair arm, the tensioner 132 for that bracket may be twisted to impart further securing pressure to the device and chair arm combination. Arrow T in FIG. 9B shows a 180° rotation of its tensioner 132 (with the chair arm removed for greater visibility).

Tensioner 132 is preferably made from a cross-section of circular plastic piping. The overall circular shape allows a smooth outer surface of each tensioner to slide through and about the cord when adding installation pressures are needed. It is to be understood, however, that still other tensioner shapes and configurations may be substituted for same.

One or more sections of rubberized material 135 may be permanently or temporarily inserted between the inside of half section 125 and chair arm A. Such material sections 135 prevent the brackets and device from moving or sliding too easily. Sections 135 will grip to, but not necessarily mark, damage, tear or imprint the leather, vinyl, plastic or fabric that most chair arm tops are covered with today.

To prevent an installed device from rotating too far around chair arm A and dumping the contents (including mouse M) of holding area 114, preferred embodiments of rear bracket 124R include a braking mechanism 155. Nearer to the rear end 113 of platform 110, one such brake is shown in accompanying FIGS. 11A through C. Therein, braking mechanism 155 includes a side face 156F, flat back portion 156B; an arched contour 157 against the exterior of half section 125; and (iii) front and rear faces 158F and R, respectively. As shown, braking mechanism 155 further includes an aperture 159 through which a portion of rod 152 slidably extends.

The other main bracket, front bracket 124F, does not need a second braking mechanism. In fact, the present invention is better served by having that forward mounting means pivotally attached to rod 152. One means for accomplishing same uses a plastic strap or eyehook 170 affixed to front bracket 124F with a bolt 170B and nut 170N as best seen in accompanying FIGS. 10A through E. Such mounting lets this latest device adjust relative movement in multiple, axial directions even after initial installation. Like the racking of a typical steering mechanism, the flexibility of eyehook 170 to front bracket 124F lets the entire device shift back-and-forth, left-to-right or diagonally to a certain extent. With the present invention, this mouse holding device can adjust in several axial directions about the fixed arm of a desk chair, much like the relative movement of a boat on the water with adjustments to roll, pitch and yaw (sometimes referred to as Tait-Bryan rotations).

For optimal use, a computer user would first situate the platform 110 over the arm A of a desk chair/workstation. Cords 130 from both brackets 124F and R would be individually stretched, extended beneath chair arm A and then firmly fitted into their respective cord holders 128. Finer adjustments can then be made for first extending the device the proper distance along the chair arm, either forward or back, in the direction of the x-axis or in a line parallel to the direction chair arm A extends. These relative extension adjustments should be made until the computer user's arm rests comfortably atop the device with the operator mouse in easy reach.

Further user adjustments can be made by slowly sliding the device from front to rear, or side-to-side, about the y-axis or substantially along the same horizontal plane as chair arm A. The latter movement is made possible by the eyehook 170 mounting to front bracket 124F along a segment of rod 152. Such mounting accommodates a twisting or diagonal rotation of the front bracket with the platform proper rising slightly above the chair arm surface at one or more points.

Figure 6:
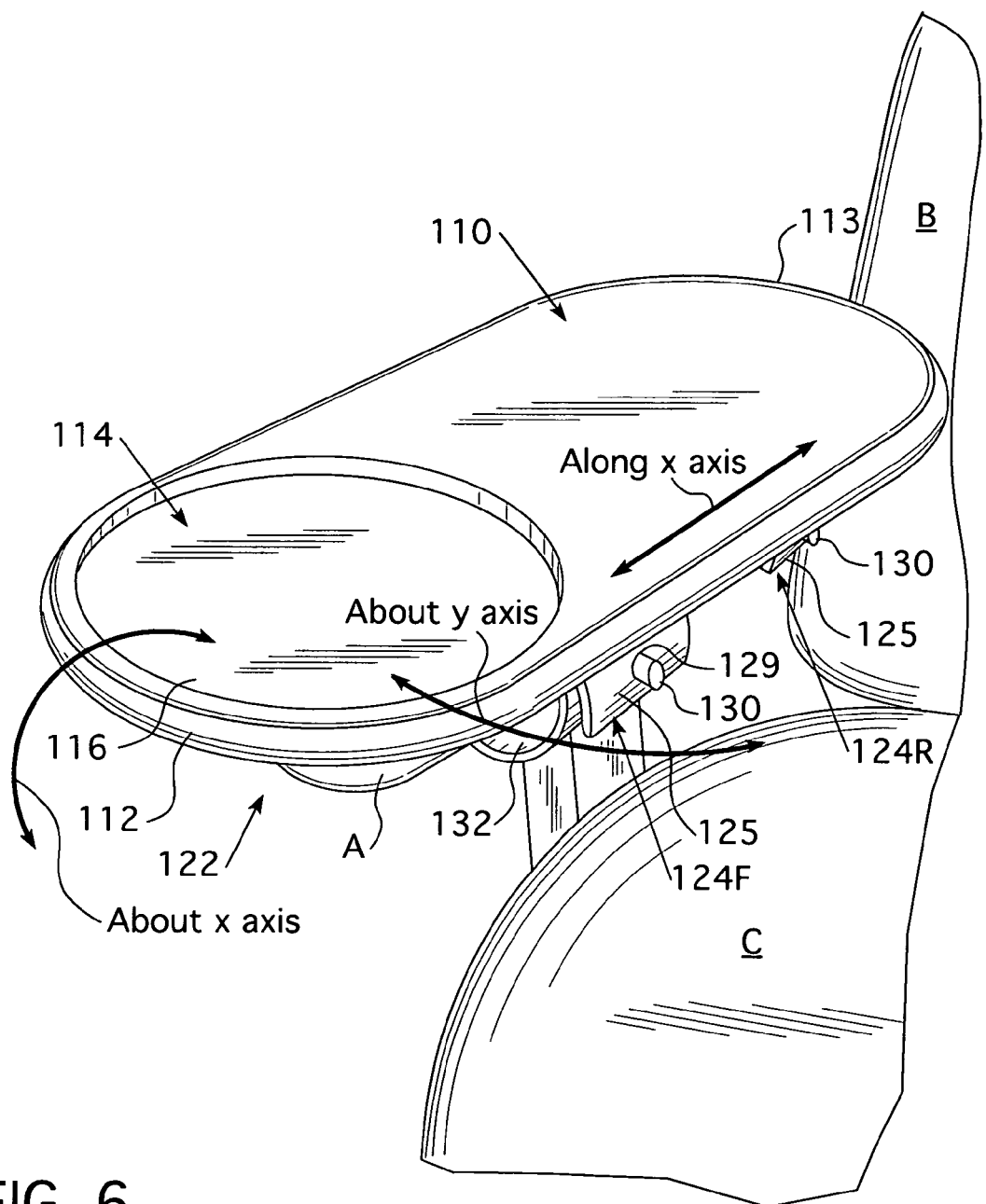
FIG. 6 is an upper right perspective view of the present invention with arrows showing its relative front-to-rear extension movement: (i) along the x-axis, i.e., a line that runs parallel to the fixed arm A of a desk chair; (ii) about the y-axis for relative lateral i.e. left-to-right or side-to-side movement on the same horizontal plane as fixed arm A; and/or (iii) about the x-axis for relative rotational, clockwise axial movement about fixed arm A.

Finally, with a mouse M duly positioned in holding area 114, the computer user may adjust relative axial rotation of the device (predominantly counterclockwise) about the x-axis (See again, FIG. 6). Braking mechanism 155 will prevent the device from being rotated too far about the chair arm A, possibly dumping all of the contents in holding area 114. All of the foregoing adjustments should be made until the computer user achieves maximum operator wrist comfort. When duly positioned, one or more tensioners may be rotated for a tighter, snug fit against the chair arm underside.

The dimensions of preferred embodiments are included by way of example. They should not be considered limiting in any way. Like the parent device, components of this latest invention may be made from a variety of aesthetically pleasing materials including wood, stainless steel, aluminum, plastic, composites or any other material(s) with sufficient strength to support a user's forearm and mouse proximate a computer.

The foregoing discussion discloses and describes merely exemplary embodiments of the parent and present inventions. One skilled in the art will readily recognize from such discussion, and from the accompanying drawings and claims, that various changes, modifications and variations can be made therein without departing from the spirit and scope of the invention.

What is claimed is:

1. A device for operating a computer mouse, said device comprising:
    a platform with a holding area in which a computer mouse may be operated or in which the mouse may rest when not in use, said platform being of a sufficient length and width for a computer operator's arm to rest thereon; and
    means for mounting the platform to a chair arm with multi-axial adjustment, said mounting means including:
        at least two flexible brackets, each bracket extending downwardly from the platform and firmly attaching to itself after the platform is situated on the chair arm while still accommodating some rotational adjustment about the chair arm; and
        a rod that extends substantially parallel to the platform and through both flexible brackets for allowing some axial extension of the platform along the chair arm.

2. The device of claim 1, wherein the holding area is located at a forward end of the platform.

3. The device of claim 1, wherein the holding area includes a recess in the platform.

4. The device of claim 1, wherein at least one flexible bracket slidably connects to the rod.

5. The device of claim 4, wherein the slidably connected bracket is situated toward a rearward end of the platform.

6. The device of claim 1, wherein one of the flexible brackets rotatably connects to the rod.

7. The device of claim 6, wherein the rotatably connected bracket is situated toward a forward end of the platform.

8. The device of claim 1, wherein each flexible bracket includes a section of armchair gripping material.

9. The device of claim 1, wherein the mounting means further includes a braking mechanism at one rod end for preventing the platform from being rotated too far about the chair arm.

10. The device of claim 9, wherein the braking mechanism is located near a rearward end of the platform.

11. A device for operating a computer mouse from a desk chair, said device designed for attaching to an arm of the desk chair and comprising:
    a platform with a holding area in which the computer mouse may be operated or in which the computer mouse may rest when not in use, said platform being sufficiently sized for a computer operator's lower arm to rest thereon; and
    means for mounting the platform to the chair arm with multi-axial adjustment, said mounting means including:
        a rod that extends substantially parallel to and beneath the platform;
        a first flexible bracket that pivotally connects to the rod and a second flexible bracket that slidably connects to the rod, each bracket extending downwardly from the platform and firmly attaching to itself after the platform is situated on the chair arm, said said pivotally connected bracket allowing for some rotational adjustment about the chair arm and slidably connected bracket allowing for some extension adjustments of the platform; and
        a braking mechanism at one end of the rod for preventing the platform from being rotated too far about the chair arm.

12. The device of claim 11, wherein the braking mechanism is located near a rearward end of the platform.

13. The device of claim 11, wherein each flexible bracket includes a section of armchair gripping material.

14. The device of claim 11, wherein said platform is made from a material selected from wood, a metal, a polymer and combinations thereof.

15. The device of claim 11, wherein said holding area includes a raised lip.

16. In a device for operating a computer mouse from the arm of a desk chair, said device comprising: (a) a platform with a holding area in which the mouse may be operated or rest when not in use, said platform being sufficiently sized for a computer operator's lower arm to rest thereon; and (b) means for pivotally mounting the platform to the desk chair arm, the improvement wherein the mounting means includes:
    a horizontally extending rod affixed to an underside of the platform; and
    a first flexible bracket that pivotally connects to the rod and a second flexible bracket that slidably connects to the rod, each bracket firmly attaching to itself after the platform is situated over the chair arm.

17. The improvement of claim 16, wherein each flexible bracket includes a section of armchair gripping material.

18. The improvement of claim 16, wherein the to provide the correct antecedent basis for the pivotally connected first bracket connected bracket is situated toward a forward end of the platform.

19. The improvement of claim 16, wherein the mounting means further includes a braking mechanism at one rod end for preventing excess rotation of the platform about the chair arm.

20. The improvement of claim 19, wherein the braking mechanism is located near a rearward end of the platform.

* * * * *